United States Patent [19]

Smith

[11] 4,222,974
[45] Sep. 16, 1980

[54] METHOD OF MAKING HERMETICALLY SEALED CONTAINER WITH FRANGIBLE SEAL

[75] Inventor: Ernest L. Smith, Kansas City, Mo.

[73] Assignee: Phillips Petroleum Company, Bartlesville, Okla.

[21] Appl. No.: 962,739

[22] Filed: Nov. 21, 1978

Related U.S. Application Data

[62] Division of Ser. No. 858,597, Dec. 8, 1977, Pat. No. 4,141,463.

[51] Int. Cl.² .................. B29C 27/04; B29C 27/08
[52] U.S. Cl. .................. 156/272; 156/69; 156/73.1; 156/324.4; 156/73.5; 156/273; 156/308.2; 156/309.9; 264/26; 264/80; 264/23; 264/248
[58] Field of Search ............... 156/69, 73.1, 273, 73.5, 156/279, 306; 215/250; 264/23, 25, 248, 80, 26; 53/477, 478

[56] References Cited

U.S. PATENT DOCUMENTS

| | | | |
|---|---|---|---|
| 2,768,762 | 10/1956 | Guinet | 215/DIG. 1 |
| 2,802,593 | 8/1957 | Slaughter | 156/69 |
| 3,047,942 | 8/1962 | Schneider et al. | 156/73.1 |
| 3,074,579 | 1/1963 | Miller | 215/DIG. 1 |
| 3,144,495 | 8/1964 | Makowski | 264/25 |
| 3,219,742 | 11/1965 | Reinert | 264/25 |
| 3,232,615 | 2/1966 | Faulkner | 264/249 |
| 3,378,423 | 4/1968 | Polk et al. | 156/273 |
| 3,458,380 | 7/1969 | Kipp | 264/248 |
| 3,462,803 | 8/1969 | Horton | 264/23 |
| 3,475,243 | 10/1969 | Scalora | 156/69 |
| 3,525,454 | 8/1970 | Frederiksen | 156/73.1 |
| 3,547,012 | 12/1970 | Amberg | 156/69 |
| 3,602,257 | 8/1971 | Berleyoung | 156/73.1 |
| 3,604,880 | 9/1971 | O'Neill | 156/69 |
| 3,767,076 | 10/1973 | Kennedy | 156/69 |
| 3,770,156 | 11/1973 | Yates | 215/250 |
| 3,846,522 | 11/1974 | Goldman | 264/25 |
| 3,909,326 | 9/1975 | Renck | 156/69 |
| 3,973,719 | 8/1976 | Johnson et al. | 220/359 |
| 4,044,941 | 8/1977 | Knudsen | 220/359 |
| 4,063,977 | 12/1977 | Groby | 156/69 |

FOREIGN PATENT DOCUMENTS 955886 10/1974 Canada .................. 215/DIG. 1

OTHER PUBLICATIONS

Obeda, "How to Get Good Ultrasonic Welds," Modern Plastics, vol. 42, Nov. 1964, pp. 130–132, 137, 191.

*Primary Examiner*—W. E. Hoag

[57] ABSTRACT

A hermetically sealed recloseable container is disclosed wherein continuous seaing means on the underside of the container closure are bonded to a coating on the rim surrounding the opening in the upper end of the container. Also disclosed is a closure and method of forming such a container using such a closure.

7 Claims, 3 Drawing Figures

METHOD OF MAKING HERMETICALLY SEALED CONTAINER WITH FRANGIBLE SEAL

This application is a divisional of application Ser. No. 858,597, filed Dec. 8, 1977, now U.S. Pat. No. 4,141,463.

This invention relates to hermetically sealed containers. In another aspect this invention relates to closure for use in forming hermetically sealed containers. In yet another aspect this invention relates to the method of obtaining hermetically sealed recloseable containers.

Hermetically sealed containers help both to maintain the freshness of container contents and to provide customers with means of detecting whether or not anyone has tampered with the contents of the container. The most common means of providing hermetically sealed containers involves the use of a membrane closure such as thin disks of thermoplastic film bonded to the upper perimeter of an open-ended container. Once such membrane closures have been opened some other type of closure must be provided. Thus many hermetically sealed containers are provided with overcaps which can be used to reclose the container after the membrane closure has been removed.

An object of the present invention is to provide a closure which can be used to hermetically seal a container and which can be used to reclose the container after the hermetic seal has been broken.

Another object of this invention is to provide a container hermetically sealed with such a closure.

The container closure of this invention comprises a top panel, one or more continuous sealing means depending downwardly from the lower surface of said top panel, each sealing means being adapted to form a frangible bond to a coating on the rim of a corresponding container to form a seal completely around the opening in the upper end of such a container, and a skirt depending downwardly from said top panel so as to surround the outer surface of the upper end of such a corresponding container.

The container closure of the instant invention can be constructed of any suitable material. The only limitation is that the sealing means be constructed of material which will form a frangible bond with the coating on the rim of a corresponding container. The term "frangible" as used herein in reference to the bond between the sealing means and the rim coating is intended to indicate that when the bond is formed and the closure is removed, the bond between the rim and the sealing means will be severed. Included within the scope of the term is the separation of the sealing means from the coating as well as the separation of portion of the coating from the rim. Preferably the total closure is constructed of thermoplastic.

The container of the instant invention can be of any suitable construction. The coating on the rim of the container around the opening can be of any suitable material which will form a frangible bond with the sealing means of the inventive closure. For example, the coating could be of any suitable adhesive. In a preferred embodiment of the present invention the coating is of thermoplastic or heat-activated adhesive which is heat-bondable to the sealing means of the closure.

The sealing means can be constructed of any material which will form an adequate bond with the coating on the rim of the container. Preferably, the sealing means is comprised of thermoplastic which upon heating will bond to the coating on the rim of the container. In an especially preferred embodiment each sealing means is generally V-shaped in cross section forming a downwardly pointing thermoplastic projection which after bonding to the rim coating will provide a bond surrounding the opening of a corresponding container. Such V-shaped sealing means, when employed, should depend downwardly such a distance that when the closure is applied with pressure after each such sealing means has been heated to a fusible and deformable state, the lower portion of the downwardly depending means will flatten and bond to the rim coating. An advantage of using the generally V-shaped sealing means is that the lower portion is more readily rendered deformable and bondable to the rim coating than a sealing means having blunt lower end. The total cross-sectional width of the area of bonding between the sealing means and the rim coating that is necessary to provide a securely sealed yet readily opened container can be determined by routine experiment. An especially preferred embodiment employs a plurality of concentric separate sealing means. Such an embodiment provides more insurance against the accidental breakage of the seal than a single sealing means while at the same time allowing the seal to be easily broken intentionally.

For a container having an outwardly directed rim it is preferable if the closure portion includes on a lower portion of the skirt inwardly directed rib means adapted to fit under the innermost portion of the outwardly directed container rim after the closure has been applied and sealed to the container. Such rib means are useful in keeping the closure in place once it is replaced after the original seal has been broken.

The sealing of a closure as described above to the coating on the rim of a corresponding container can be accomplished in any suitable manner. In a preferred embodiment employing a closure in which the sealing means are thermoplastic, one heats the thermoplastic sealing means to render the sealing means bondable to the rim coating and applies the closure with pressure, both under conditions such that the closure bonds to the container only where the sealing means contacts the rim coating. The heating of the sealing rings in such a technique can be accomplished in any suitable manner. The only limitation is that the sealing rings must be heated in such a fashion that the closure will bond only where said sealing means contact said container.

One preferred method of heating the sealing means involves applying the closure to the container with pressure and then applying ultrasonic vibrations to the sealing means. Another method involves heating the sealing means with narrowly directed jets of hot gas prior to the application of the closure to the container. Yet another method involves heating the sealing means with infrared heat. Still another method involves the induction heating of suitable electrically conductive means suitably positioned in the container closure, the rim of the container, or both. For example, one could embed a suitable electrically conductive ring in a portion of the closure superimposed immediately above the sealing means.

Sealing means of polyethylene can be rendered suitably bondable to the rim coating by heating the sealing means to a temperature in the range of 300° F.–350° F. (149° C.–176° C.).

A better understanding of the present invention will follow from a description of a preferred embodiment of the present invention as illustrated in the accompanying drawings in which.

Figure 1:
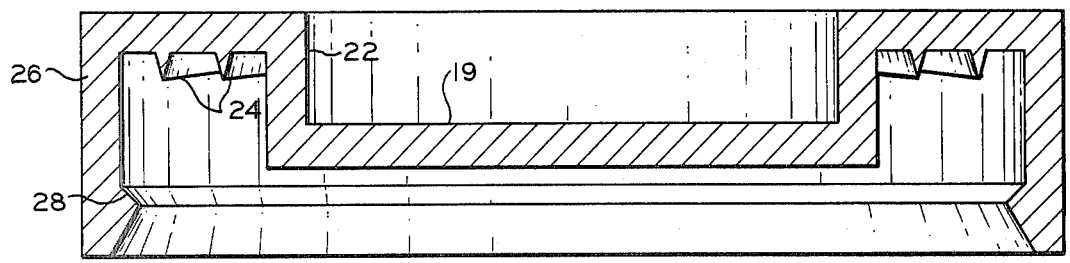
FIG. 1 is a cross-sectional view of a preferred closure embodying the present invention.

The closure 1 illustrated in FIG. 1 comprises a circular top panel 20 having downwardly directed from its inner periphery a cylindrical portion 22, surrounding a central discoidal portion 19. Depending downwardly from the lower surface 18 of the top panel 20 are two generally V-shaped sealing means 24. Depending downwardly from the outer periphery of said top panel 20 is an annular skirt 26. The lower portion of said annular skirt 26 includes an inwardly disposed rib 28 which from its innermost point relative to the center of the closure inclines outwardly and downwardly to the end of the annular skirt 26.

Figure 2:
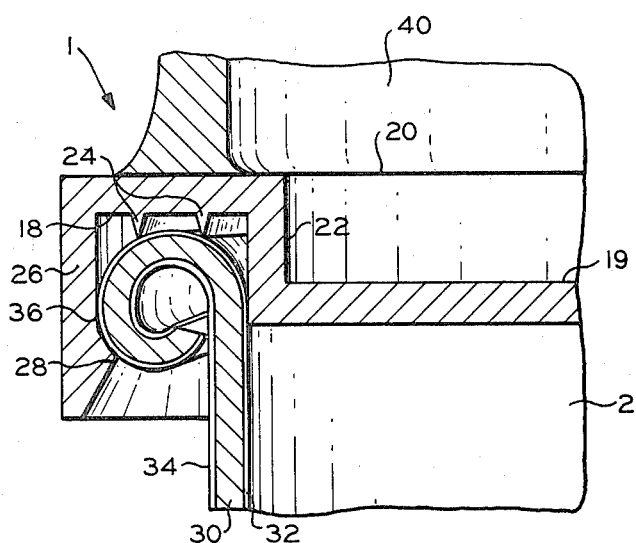
FIG. 2 is a partial cross-sectional view of the closure of FIG. 1 applied to a container prior to the forming of a hermetic seal.

FIG. 2 illustrates the closure of FIG. 1 being applied to a container 1 for which it is particularly suitable, viz., a cylindrical container having a paperboard sidewall. FIG. 2 illustrates a cross section of the upper end of such a container. In the illustration the container sidewall comprises paperboard 30 coated on both surfaces with a thermoplastic coating 32 and 34 such as polyethylene. The upper end of the container sidewall is rolled outwardly and inwardly to form an outwardly disposed rim 36 with a generally circular cross-sectional configuration.

It will be noted in FIG. 2 that the sealing means 24 of the closure 1 are positioned in the closure 1 such that they contact the upper surface of the rim 36 when the closure is applied to the container 2.

FIG. 2 also illustrates one method in which the sealing means can be rendered sufficiently deformable and heat-sealable to provide the hermetic seal. FIG. 2 illustrates that after the closure 1 is applied to the container 2 a ring-shaped ultrasonic horn 40 applies ultrasonic vibration to the closure to cause the sealing means to be rendered bondable to the thermoplastic coating 32 of the container 2.

As the closure 1 is applied to the container the annular skirt 26 bends outwardly as the rib 28 passes over the outermost portion of the container rim 36. Once the sealing means 24 are in a deformable state and the closure 1 is forced downward onto the container 2 with pressure, the sealing means 24 will be deformed so that the closure 1 fits onto the container 2 in such a manner that the rib 28 rests beneath the outermost portion of the container rim 36.

Figure 3:
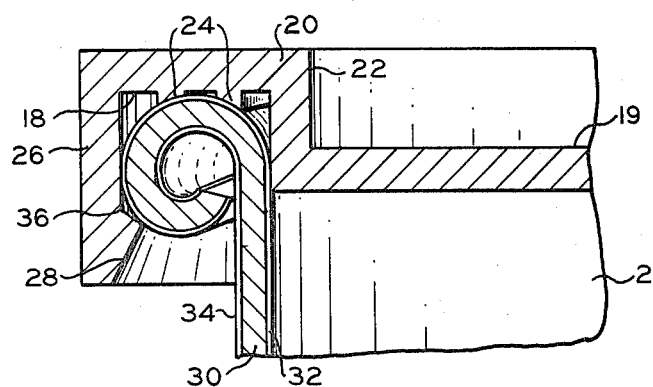
FIG. 3 is a partial cross-sectional view of the closure of FIG. 1 after the hermetic seal has been obtained.

FIG. 3 illustrates that after the closure 1 has been hermetically sealed to the container 2, a bond is provided between the point of contact of the sealing means 24 and the container rim 36. Removal of the closure will result in the elimination of the bond between the sealing means and the container rim.

The aforementioned downwardly directed portion 22 of closure 1 is formed such that after said container is sealed the inside surface of portion 22 contacts the inside surface of the upper end portion of the container. Preferably the annular skirt 26 and rib 28 are formed such that after the container is sealed both the annular skirt 26 and the rib 28 thereof are in contact with the container rim 36 around the periphery of said container.

Such a closure has been illustrated in FIGS. 1-3. As shown by FIG. 3, the top panel 20, the downwardly depending portion 22, and the annular skirt 26 provide a downwardly opening trough in which the outwardly disposed rim 36 is contained once the container 2 has been sealed with closure 1.

Generally in such container the thickness of the paperboard in the sidewall is in the range of about 14 to about 28 mils and the thermoplastic coatings 32 and 34 are of a thickness in the range of about 0.0004 to about 0.0001 inch.

While the appended FIGURES and the above description thereof illustrate a preferred embodiment of the present invention, it is to be recognized that the invention is not limited solely to the illustrated embodiment. For example, while the closure 1 illustrated has a circular top panel 20 with a depending cylindrical portion 22 and a discoidal portion 19, top panel 20 can extend across the top in one plane and still provide a hermetically sealed container. Rim 36 can be of other configurations such as oval, square or rectangular and the like.

It is to be understood that other variations which will be obvious in view of this disclosure are within the scope of the claimed invention.

What is claimed is:

1. A method of hermetically sealing a container, the upper end of which comprises an opening and a rim surrounding said opening, said rim having on its upper surface a bondable coating, with a closure having a top panel, at least one downwardly pointing thermoplastic sealing ring projection generally V-shaped in cross-section which is adapted to rest upon said rim of said container completely around said opening, and a skirt depending downwardly from said top panel and being adapted to surround the outer surface of an upper end of said container, said method comprising heating said at least one sealing ring projection to render said at least one sealing ring projection bondable to the coating on the rim and applying said closure to said container such that said closure bonds to said container only where said sealing rings contact said container.

2. A method according to claim 1 wherein said closure is applied to said container and said at least one thermoplastic ring is heated by imparting ultrasonic vibration to the sealing rings.

3. A method according to claim 1 wherein said at least one thermoplastic ring is heated with hot gas and then said closure is applied to said container.

4. A method according to claim 1 wherein said at least one thermoplastic ring is heated with infrared heat and then said closure is applied to said container.

5. A method according to claim 1 wherein said closure is applied to said container and said at least one thermoplastic ring is heated by the induction heating of suitably positioned electrically conductive means.

6. A method according to claim 1 wherein said bondable coating on said rim is a thermoplastic coating.

7. A method according to claim 1 wherein said container is constructed of paperboard and said rim comprises an outwardly rolled portion of the upper end of the container sidewall, said outwardly rolled portion being generally circular in cross-section.

* * * * *